United States Patent
Chen et al.

(10) Patent No.: US 8,423,079 B2
(45) Date of Patent: Apr. 16, 2013

(54) COMMUNICATION CHANNEL SETTING METHOD AND COMMUNICATION CHANNEL SELECTION METHOD FOR AN ELECTRONIC DEVICE

(75) Inventors: Te-Mu Chen, Taoyuan County (TW); Wen-Pin Liao, Taoyuan County (TW); Chih-Yu Huang, Taoyuan County (TW); Chin-Yu Wang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 295 days.

(21) Appl. No.: 12/913,774

(22) Filed: Oct. 28, 2010

(65) Prior Publication Data
US 2012/0003939 A1    Jan. 5, 2012

(30) Foreign Application Priority Data
Jul. 5, 2010    (TW) ............................... 99122051 A

(51) Int. Cl.
*H04M 1/00*    (2006.01)
*H04B 1/10*    (2006.01)

(52) U.S. Cl.
USPC ....................................... 455/552.1; 455/296

(58) Field of Classification Search ........ 455/41.1–41.3, 455/451, 552.1, 509, 557, 63.1, 114.2, 296, 455/501, 517, 522, 445, 456.1, 456.5
See application file for complete search history.

(56) References Cited

U.S. PATENT DOCUMENTS

| | | | |
|---|---|---|---|
| 2009/0143095 A1 | 6/2009 | Zhang | |
| 2009/0262785 A1* | 10/2009 | Wilhelmsson | 375/133 |
| 2010/0322287 A1* | 12/2010 | Truong et al. | 375/133 |
| 2011/0009136 A1* | 1/2011 | Mantravadi et al. | 455/501 |

OTHER PUBLICATIONS

"Search Report of European Counterpart Application", issued on Feb. 4, 2011, p. 1-p. 4.
Jing Zhu et al., "Enabling collocated coexistence in IEEE 802.16 networks via perceived concurrency—[WiMAX update]" IEEE Communications Magazine, IEEE Service Center, Piscataway, US, vol. 47, No. 6, Jun. 1, 2009, pp. 108-114.

* cited by examiner

*Primary Examiner* — Nay A Maung
*Assistant Examiner* — Cindy Trandai
(74) *Attorney, Agent, or Firm* — Jianq Chyun IP Office

(57) ABSTRACT

A communication channel setting method and a communication channel selection method for an electronic device are provided. The communication channel setting method measures the interference between two communication protocols implemented on the same electronic device and stores threshold values and a look-up table obtained from the measurements in the electronic device. Next, the electronic device executes the channel selection method. The channel selection method selects usable channels of one of the two communication protocols according to the threshold values and the look-up table, thereby preventing or alleviating the interference between the communication protocols.

9 Claims, 3 Drawing Sheets

COMMUNICATION CHANNEL SETTING METHOD AND COMMUNICATION CHANNEL SELECTION METHOD FOR AN ELECTRONIC DEVICE

CROSS-REFERENCE TO RELATED APPLICATION

This application claims the priority benefit of Taiwan application serial No. 99122051, filed on Jul. 5, 2010. The entirety of the above-mentioned patent application is hereby incorporated by reference herein and made a part of this specification.

BACKGROUND OF THE INVENTION

1. Field of the Invention

The disclosure relates generally to a method of communication channel setting and a method of communication channel selection for an electronic device. More particularly, the disclosure relates to a communication channel setting method and a communication channel selection method capable of avoiding interference between two communication protocols.

2. Description of Related Art

Current mobile phones generally support the Bluetooth and the Worldwide Interoperability for Microwave Access (WiMAX) wireless communication protocols. Bluetooth is typically employed by earphones and other gadget accessories, whereas WiMAX is used for connection to the Internet.

As the functionality and portability of mobile phones advance, a frequent scenario occurs when the mobile phone uses both Bluetooth and WiMAX. When both of these communication protocols transmit signals or receive signals simultaneously, there is no interference issue between the two protocols. However, when one of the communication protocols transmits signals while the other communication protocol receives signals, since the frequency bands used by the two communication protocols are in close proximity, the prior protocol is affected by the noise received by the latter protocol, thereby degrading communication quality.

SUMMARY OF THE INVENTION

An aspect of the disclosure provides a communication channel setting method and a communication channel selection method adapted for an electronic device, capable of preventing or alleviating interference between two communication protocols.

An aspect of the disclosure provides a method of communication channel setting which uses an electronic device to perform a plurality of measurements. The electronic device supports a first communication protocol and a second communication protocol. The first communication protocol is divided into a plurality of first channels, and the second communication protocol is divided into a plurality of second channels. The method of communication channel setting includes the following steps. First, for each combination of each of the first channels and each output power level of the electronic device on the first channel, measure a usable channel quantity corresponding to the combination. The usable channel quantity is the quantity of the second channels not interfered by signal transmission of the first channel and not interfering with signal reception of the first channel in the combination. Thereafter, build a look-up table according to the usable channel quantity corresponding to each of the combinations, and store the look-up table in the electronic device. According to the look-up table, the electronic device determines the quantity of the second channels for concurrent use with the first communication protocol.

According to an embodiment of the disclosure, the step of measuring the usable channel quantity corresponding to each of the combinations includes the following steps. When the electronic device uses the second communication protocol for signal reception, measure the quantity of the second channels not interfered by signal transmission of the first channel in the combination, and use the measurement result as a usable quantity of the receiving channels corresponding to the combination. When the electronic device uses the second communication protocol for signal transmission, measure the quantity of the second channels not interfering with signal reception of the first channel in the combination, and use the measurement result as a usable quantity of transmitting channels corresponding to the first channel. Thereafter, take a smallest value of the usable quantity of receiving channels and the usable quantity of transmitting channels as the usable channel quantity corresponding to the combination.

According to an embodiment of the disclosure, the method of communication channel setting further includes the following steps. For each of the first channels, measure a threshold value corresponding to the first channel. The threshold value is defined as follows. When the output power of the electronic device on the first channel is smaller than the threshold value, then signal reception of the electronic device on each of the second channels is not interfered. Otherwise, signal reception of the electronic device on the second channels is interfered. Thereafter, store the threshold value corresponding to each of the first channels in the electronic device. The electronic device determines the quantity of the second channels for concurrent use with the first communication protocol according to the threshold values. An aspect of the disclosure provides a method of communication channel selection executed by the electronic device. The method of communication channel selection includes the following steps. First, the electronic device determines whether one of the first communication protocol and the second communication protocol is in a transmission mode and the other one of the first communication protocol and the second communication protocol is in a reception mode. When the determination is affirmative, the electronic device obtains a first channel serial number of the first channel that is currently used from a base station supporting the first communication protocol. The electronic device determines a useable channel quantity of the second channel according to the first channel serial number and the output power of the electronic device on the first channel. Thereafter, the electronic device uses the usable channel quantity of the second channels having frequencies farthest away from the frequency band of the first communication protocol.

According to an embodiment of the disclosure, the electronic device stores a threshold value corresponding to each of the first channels. Moreover, the step of the electronic device determining the usable channel quantity includes the following steps. When the output power of the electronic device on the first channel is smaller than the threshold value, the electronic device sets the usable channel quantity to the total quantity of the second channels.

According to an embodiment of the disclosure, the electronic device stores a look-up table, and the step of the electronic device determining the usable channel quantity includes the following steps. The electronic device obtains the usable channel quantity from the look-up table according to the first channel serial number and the output power.

According to an embodiment of the disclosure, the step of the electronic device determining the usable channel quantity further includes the following steps. When the usable channel quantity is smaller than a predetermined value, the electronic device sets the usable channel quantity to the predetermined value.

According to an embodiment of the disclosure, the first communication protocol is a Worldwide Interoperability for Microwave Access (WiMAX) communication protocol, and the second communication protocol is a Bluetooth communication protocol.

In summary, the communication channel setting method according to an embodiment of the disclosure can measure an interference condition between two communication protocols of a same electronic device and store measured data in the electronic device. Thereafter, the electronic device can execute the communication channel selection method according to the embodiment of the disclosure. The usable channels can be selected in accordance with the measured data, so as to prevent or alleviate the interference between the two communication protocols and enhance a communication quality.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
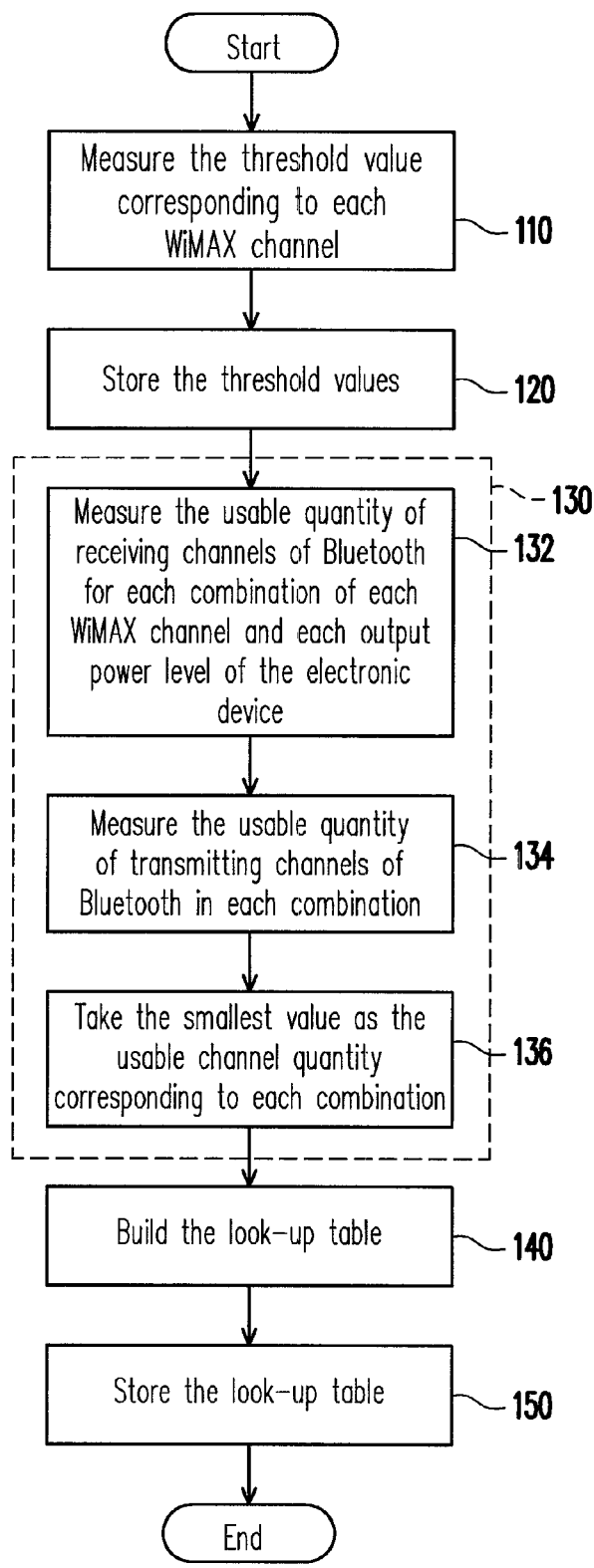
FIG. 1 is a flowchart illustrating a method of communication channel setting according to an embodiment of the disclosure.

FIG. 1 is a flowchart illustrating a method of channel setting according to an embodiment of the disclosure. The channel setting method depicted in FIG. 1 employs an electronic device to perform a plurality of measurements. The electronic device may be a mobile phone, a personal digital assistant (PDA), a notebook computer, a desktop computer, or similar electronic devices. As long as an electronic device supports a plurality of communication protocols, the frequency bands of these communication protocols are divided into a plurality of channels, and the communication protocols may interfere with each other due to proximity of the frequency in use, then the method described in the present embodiment is suitable for this electronic device.

Figure 2:
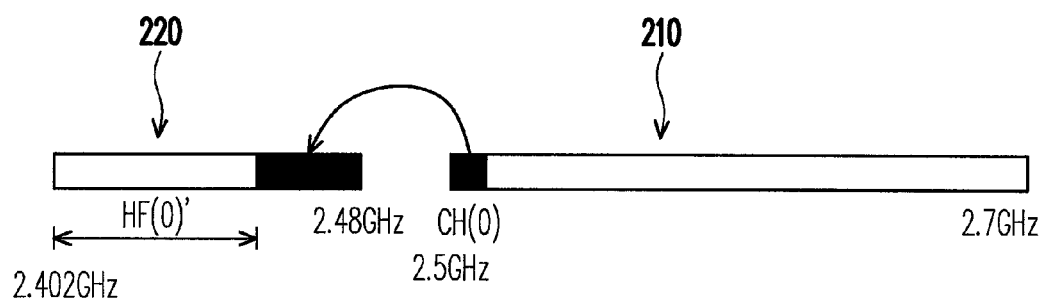
FIGS. 2 and 3 are schematic views illustrating communication channel interference according to an embodiment of the disclosure.
Figure 3:
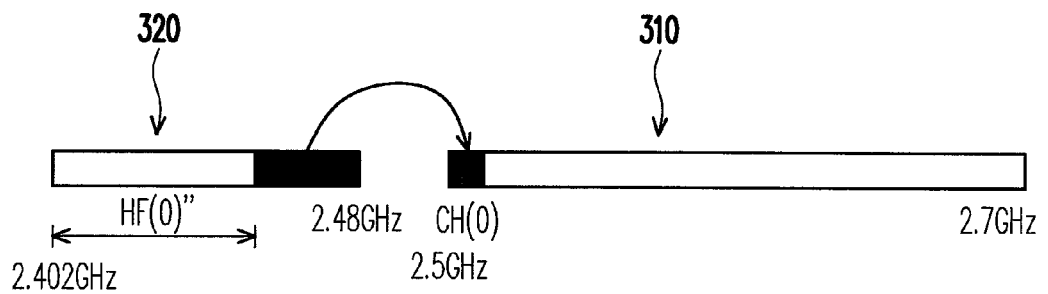

FIGS. 2 and 3 are schematic views illustrating channel interference according to the present embodiment of the disclosure. The electronic device according to the present embodiment supports both the Bluetooth and the WiMAX communication protocols. As shown in FIGS. 2 and 3, a frequency band of the Bluetooth protocol is from 2.402 GHz to 2.48 GHz, whereas a frequency band of the WiMAX protocol is from 2.5 GHz to 2.7 GHz. The frequency bands of the Bluetooth and WiMAX protocols are divided into a plurality of channels, and only a portion and not the entire bandwidth in the frequency band is used at a time. The currently used WiMAX channel is determined by a WiMAX base station, but the electronic device is free to select which Bluetooth channel to use. In the channel setting method depicted in FIG. 1, the aforesaid electronic device is used to perform a plurality of measurements, so as to obtain a plurality of threshold values and a look-up table. Thereafter, the electronic device may execute a channel selection method depicted in FIG. 4, whereby the threshold values and the look-up table are used to select a Bluetooth channel not affected by WiMAX interference while also not interfering with the WiMAX protocol. Accordingly, the electronic device can use both the Bluetooth and the WiMAX communication protocols concurrently, while also preventing mutual interference between the communication protocols.

The process depicted in FIG. 1 is further elaborated hereinafter together with FIGS. 2 and 3. First, for each of the WiMAX channels, a threshold value corresponding to the WiMAX channel is measured (Step 110). In the present embodiment of the disclosure, each of the WiMAX channels has a corresponding threshold value. The threshold value is defined as, when an output power of the electronic device on a predetermined first channel is smaller than the corresponding threshold value, then signal reception for the same electronic device in each Bluetooth channel is not interfered. Conversely, when the output power of the electronic device on the first channel is larger than the corresponding threshold value, then signal reception for the same electronic device on a Bluetooth channel (e.g., any Bluetooth channel) is interfered.

In practice, the threshold value is determined by the designs of the electronic device, the Bluetooth receiver device, and the WiMAX receiver device. In the present embodiment, the threshold value of each of the WiMAX channels is obtained in laboratory from automatic measurements made by readily available instruments on the market. Interference between the Bluetooth and WiMAX protocols is determined by whether sensitivity of the receiver device has varied. For example, assume that the electronic device transmits a signal in a predetermined WiMAX channel at the same time a predetermined Bluetooth channel receives a signal. When the transmitted signal from the WiMAX channel causes a sensitivity variation of the Bluetooth receiver device to exceed a predetermined tolerance value, then the WiMAX protocol is determined to have interfered with the Bluetooth protocol. When the sensitivity variation is within the tolerance value, then it is judged that the WiMAX protocol did not interfere with the Bluetooth protocol.

Thereafter, the threshold values measured in Step 110 corresponding to each of the WiMAX channels are stored in the electronic device (Step 120). Using the channel selection method depicted in FIG. 4, the electronic device determines a Bluetooth channel quantity for concurrent use with the WiMAX protocol according to the threshold values stored therein.

Thereafter, in Step 130, for each combination of each of the WiMAX channels and each output power level of the electronic device in the WiMAX channel, a usable channel quantity corresponding to the combination is measured. For example, when the frequency band of the WiMAX protocol is divided into A channels, and the WiMAX output power of the electronic device is divided into B levels, then a total number of the aforesaid combinations is a product of A and B. Therefore, Step 130 requires measurements of the corresponding usable channel quantity for each of the combinations. The usable channel quantity is defined as the Bluetooth channel quantity in the corresponding combination not interfered by signal transmission of the corresponding WiMAX channel, while also not interfering with signal reception of the corresponding WiMAX channel. The afore-described interference is similarly observed in laboratory from automatic measurements made by readily available instruments on the market. Moreover, interference between the Bluetooth and WiMAX protocols is determined by whether the sensitivity of the receiver device has changed. Since the usable Bluetooth channels are the farthest successive channels in the Bluetooth frequency band away from the WiMAX frequency band, therefore Step 130 does not require recording which Bluetooth channels are usable, but only the usable channel quantity is stored.

Step 130 is further divided into Steps 132, 134, and 136. First, when the electronic device uses the Bluetooth communication protocol for signal reception, the Bluetooth channel quantity in each of the aforesaid combinations not interfered by signal transmission of the corresponding WiMAX channel is measured, and a measurement result is used as a usable quantity of receiving channels (Step 132). Thereafter, when the electronic device uses the Bluetooth communication protocol for signal transmission, the Bluetooth channel quantity in each of the aforesaid combinations which do not interfere with signal reception of the corresponding WiMAX channel is measured, and a measurement result is used as a usable quantity of transmitting channels corresponding to the WiMAX channel (Step 134). The order of Steps 132 and 134 may be interchanged without substantially affecting the present embodiment. Thereafter, by taking a smallest value of the usable quantity of receiving channels and the usable quantity of transmitting channels, the usable channel quantity corresponding to the combination is obtained (Step 136).

FIGS. 2 and 3 illustrate an example of Step 130. The example measures a usable channel quantity corresponding to a combination of a WiMAX channel CH[0] having a serial number 0 and a predetermined WiMAX output power level. FIG. 2 illustrates a scenario when the electronic device transmits a WiMAX signal while simultaneously receiving a Bluetooth signal. A WiMAX frequency band 210 and a Bluetooth frequency band 220 are represented for illustration. The WiMAX channel CH[0] interferes with a black portion in the Bluetooth frequency band 220, and a channel quantity HF(0)'' represented by a white portion is not interfered. Moreover, the channel quantity HF(0)'' is the usable quantity of receiving channels measured by Step 132. FIG. 3 illustrates a scenario when the electronic device receives a WiMAX signal while simultaneously transmits a Bluetooth signal. A WiMAX frequency band 310 and a Bluetooth frequency band 320 are represented for illustration. The WiMAX channel CH[0] is interfered from a black portion in the Bluetooth frequency band 320, and a channel quantity HF(0)'' represented by a white portion does not interfere with the WiMAX channel CH[0]. Moreover, the channel quantity HF(0)'' is the usable quantity of transmitting channels measured by Step 134. The smallest value of the channel quantities HF(0)'' and HF(0)'' represents the usable channel quantity in Step 136. In other words, the smallest value represents the usable channel quantity measured in the entire Step 130 corresponding to the afore-described combination.

Figure 4:
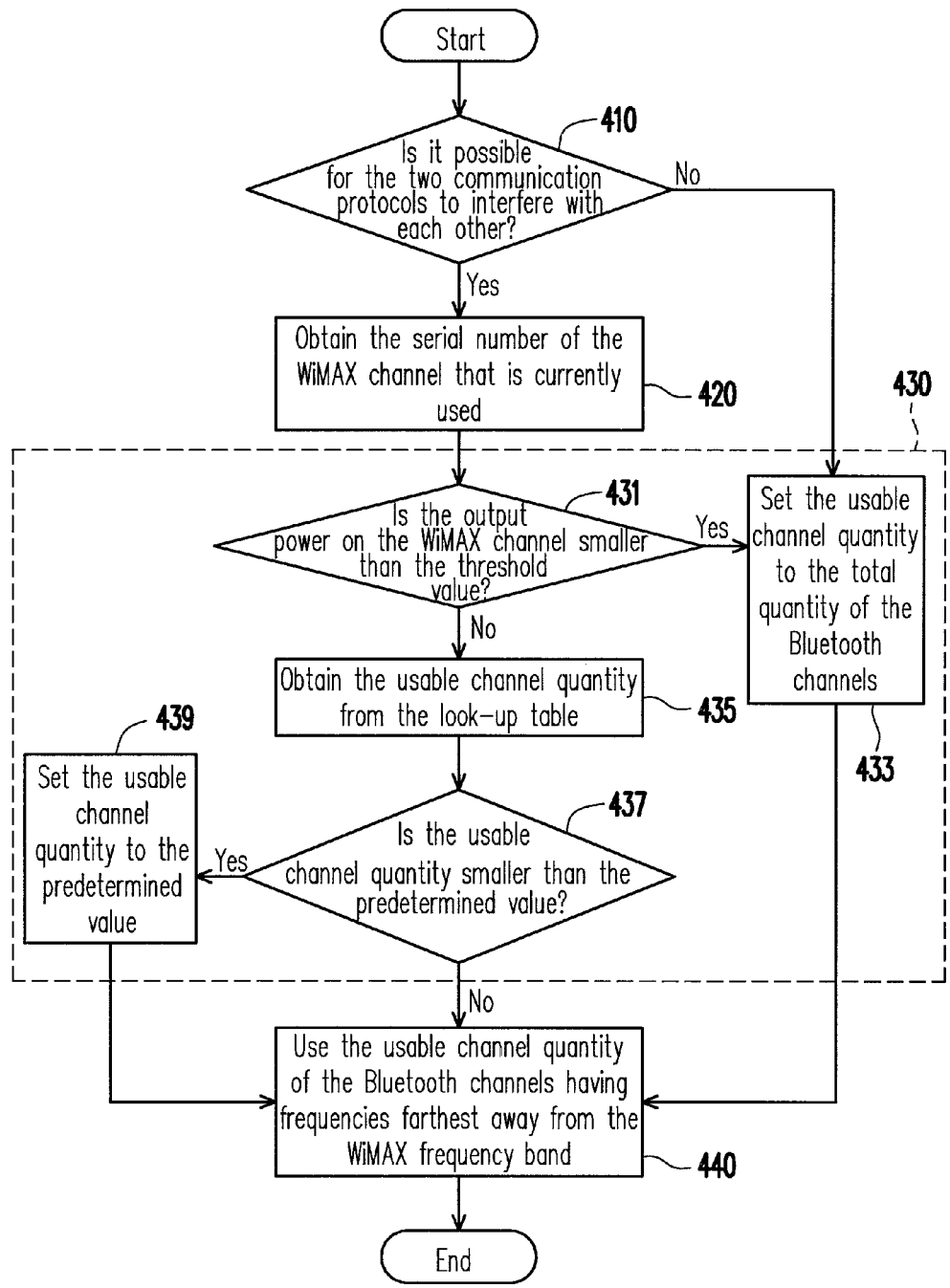
FIG. 4 is a flowchart illustrating a method of channel selection according to an embodiment of the disclosure.

After Step 130, in Step 140, a look-up table is built according to the usable channel quantity corresponding to each of the combinations. Thereafter, in Step 150, the look-up table is stored in the electronic device. Using the channel selection method depicted in FIG. 4, the electronic device determines the Bluetooth channel quantity for concurrent use with the WiMAX communication protocol according to the look-up table. FIG. 1 is a flowchart illustrating a method of channel selection according to an embodiment of the disclosure. The channel selection method is executed by the afore-described electronic device. The process depicted in FIG. 4 is further elaborated hereinafter. First, the electronic device determines whether one of the WiMAX communication protocol and the Bluetooth communication protocol is in a transmission mode and whether the other one thereof is in a reception mode (Step 410). When the above determination is affirmative, then the two communication protocols may interfere with each other, and the process proceeds to Step 420.

Conversely, when the above determination is negative, then both the WiMAX and the Bluetooth communication protocols are in the transmission mode or the reception mode. Under this condition, the two communication protocols do not mutually interfere, hence all of the Bluetooth channels are usable. Therefore, proceeding to Step 433, the usable channel quantity is set to a total quantity of the Bluetooth channels. Thereafter, in Step 440, the usable channel quantity of Bluetooth channels having frequencies farthest away from the WiMAX frequency band is used. Under the aforesaid condition, the electronic device can use all of the Bluetooth channels.

When the determination of Step 410 is affirmative, then the electronic device obtains a WiMAX channel serial number of the currently used WiMAX channel (Step 420) from a base station supporting the WiMAX protocol. Thereafter, according to the WiMAX channel serial number and the output power of the electronic device on the WiMAX channel, the useable channel quantity at this time is determined (Step 430). The WiMAX output power of the electronic device is determined in accordance with a signal quality of the base station. When a base station signal is weak, then a comparatively larger WiMAX output power is required. When the base station signal is strong, then the WiMAX output power can be comparatively smaller.

Step 430 is further divided into a plurality of steps. First, the electronic device checks whether the output power on the WiMAX channel at this time is smaller than the corresponding threshold value (Step 431). When the result is affirmative, this represents the WiMAX protocol would not interfere with the Bluetooth protocol, and thus all the Bluetooth channels are usable. Therefore, the electronic device sets the usable channel quantity to the total quantity of all the Bluetooth channels (Step 433). When the result is negative, this represents the WiMAX protocol would interfere with the Bluetooth protocol, and correspondingly the electronic device obtains the usable channel quantity at this time, from the look-up table stored therein according to the WiMAX channel serial number and the WiMAX output power. The look-up table has stored therein the usable channel quantities corresponding to each of the combinations formed by all of the WiMAX channels and all of the WiMAX output power levels. The usable channel quantity corresponding to the current combination can be extracted by merely determining the level of the current WiMAX output power, in addition to the serial number of the currently used WiMAX channel.

The Bluetooth protocol requires a specific channel quantity for normal operation. Therefore, the electronic device checks whether the usable channel quantity is smaller than a predetermined value, in which the predetermined value may be 20 to 25 channels (Step 437). When the result is affirmative, the electronic device can set the usable channel quantity to the predetermined value (Step 439), so as to ensure the normal operation of the Bluetooth protocol. Thereafter, the process proceeds to Step 440. When the result of Step 437 is negative, where the usable channel quantity is not less than the predetermined value, the process also proceeds to Step 440. In Step 440, the electronic device uses the usable channel quantity of the Bluetooth channels having frequencies farthest away from the WiMAX frequency band. In the measurement process depicted in FIG. 1, it is confirmed that interference do not occur between these Bluetooth channels and the WiMAX protocol. Therefore, by using only these Bluetooth channels, the interference between two communication protocols can be avoided. Even when the usable channel quantity is increased to the predetermined value due to an insufficient number of channels (Step 439), since these Bluetooth channels are located at an end farthest away from the WiMAX frequency band, using these Bluetooth channels may at least alleviate the interference between the two communication protocols.

The channel setting method and the channel selection method according to the present embodiment may be simplified by omitting the threshold value. In other words, the electronic value may use only the look-up table to determine the currently usable quantity of the Bluetooth channels. In this scenario, Steps 110 and 120 of the process depicted in FIG. 1 may be skipped, so that the process therein directly begins with Step 130. Moreover, the process depicted in FIG. 4 may skip over the Skip 431, so that after Step 420, the process therein directly proceeds to Step 435.

Although the electronic device according to the present embodiment supports the Bluetooth and WiMAX communication protocols, it should not be construed that the scope of the disclosure is limited thereto. The two communication protocols may be interchanged with other communication protocols having similar characteristics.

In view of the foregoing, the channel setting method according to the present embodiment can measure an interference condition between two communication protocols of a same electronic device and store measured data in the electronic device. Thereafter, the electronic device can execute the channel selection method according to the embodiment of the disclosure. The usable channels can be selected in accordance with the measured data, so as to prevent or alleviate the interference between the two communication protocols and enhance a communication quality.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A method of communication channel setting, performing a plurality of measurements of the method of communication channel setting based on an electronic device, the electronic device supporting a first communication protocol and a second communication protocol, a frequency band of the first communication protocol being divided into a plurality of first channels, a frequency band of the second communication protocol being divided into a plurality of second channels, the method of communication channel setting comprising:

for each combination of each of the first channels and each output power level of the electronic device on the first channel, measuring a usable channel quantity corresponding to the combination; wherein the usable channel quantity is a quantity of the second channels not interfered by signal transmission from the first channel and not interfering with signal reception of the first channel in the combination;

building a look-up table according to the usable channel quantity corresponding to each of the combinations; and storing the look-up table in the electronic device, wherein the electronic device determines a quantity of the second channels for concurrent use with the first communication protocol according to the look-up table, a serial number of the first channel that is currently used by the electronic device obtained from a base station supporting the first communication protocol, and an output power of the electronic device on the first channel that is currently used.

2. The method of communication channel setting as claimed in claim 1, wherein the step of measuring the usable channel quantity corresponding to each of the combinations comprises:

when the electronic device uses the second communication protocol for signal reception, measuring a quantity of the second channels not interfered by signal transmission of the first channel in the combination, and using a result of the measuring as a usable quantity of receiving channels corresponding to the combination;

when the electronic device uses the second communication protocol for signal transmission, measuring a quantity of the second channels not interfering with signal reception of the first channel in the combination, and using a result of the measuring as a usable quantity of transmitting channels corresponding to the first channel; and taking a smallest value of the usable quantity of receiving channels and the usable quantity of transmitting channels as the usable channel quantity corresponding to the combination.

3. The method of communication channel setting as claimed in claim 1, further comprising:

for each of the first channels, measuring a threshold value corresponding to the first channel, wherein when the output power of the electronic device on the first channel is smaller than the threshold value, then signal reception of the electronic device on each of the second channels is not interfered; otherwise, signal reception of the electronic device on the second channels is interfered; and storing the threshold value corresponding to each of the first channels in the electronic device, wherein the electronic device determines the quantity of the second channels for concurrent use with the first communication protocol according to the threshold values.

4. The method of communication channel setting as claimed in claim 1, wherein the first communication protocol is a Worldwide Interoperability for Microwave Access (WiMAX) communication protocol, and the second communication protocol is a Bluetooth communication protocol.

5. A method of communication channel selection executed by an electronic device supporting a first communication protocol and a second communication protocol, a frequency hand of the first communication protocol being divided into a plurality of first channels, a frequency band of the second communication protocol being divided into a plurality of second channels, the method of communication channel selection comprising:

the electronic device determining whether one of the first communication protocol and the second communication protocol is in a transmission mode and the other one of the first communication protocol and the second communication protocol is in a reception mode;

when the determination is affirmative, the electronic device obtaining a first channel serial number of the first channel that is currently used from a base station supporting the first communication protocol;

the electronic device determining a useable channel quantity according to the first channel serial number and an output power of the electronic device on the first channel; and the electronic device using the usable channel quantity of the second channels having frequencies farthest away from the frequency band of the first communication protocol.

6. The method of communication channel selection as claimed in claim 5, wherein the electronic device stores a threshold value corresponding to the first channel, when an output power of the electronic device on the first channel is smaller than the threshold value, then signal reception of the electronic device on each of the second channels is not interfered; otherwise, signal reception of the electronic device on the second channels is interfered; wherein the step to determine the usable channel quantity comprises:

when the output power of the electronic device on the first channel is smaller than the threshold value, the electronic device setting the usable channel quantity to a total quantity of the second channels.

7. The method of communication channel selection as claimed in claim 5, wherein the electronic device stores a look-up table, and the step of determining the useable channel quantity comprises:

the electronic device obtaining the usable channel quantity from the look-up table according to the first channel serial number and the output power.

8. The method of communication channel selection as claimed in claim 7, wherein the step of determining the useable channel quantity further comprises:

when the usable channel quantity is smaller than a predetermined value, the electronic device setting the usable channel quantity to the predetermined value.

9. The method of communication channel selection as claimed in claim 5, wherein the first communication protocol is a Worldwide Interoperability for Microwave Access (WiMAX) communication protocol, and the second communication protocol is a Bluetooth communication protocol.

* * * * *